United States Patent [19]

Jamison et al.

[11] 4,342,491
[45] Aug. 3, 1982

[54] SELF-LUBRICATING JOURNAL BEARING

[75] Inventors: Warren E. Jamison, Evergreen; Raymond C. Pennington, Denver, both of Colo.

[73] Assignee: Projected Lubricants, Inc., Denver, Colo.

[21] Appl. No.: 133,515

[22] Filed: Mar. 24, 1980

[51] Int. Cl.³ .......................... F16C 33/00; F16C 1/24; F16C 33/66
[52] U.S. Cl. ..................... 308/239; 308/76; 308/77; 308/78; 308/240
[58] Field of Search ................ 308/239, 240, 76, 77, 308/78

[56] References Cited

U.S. PATENT DOCUMENTS

| | | | |
|---|---|---|---|
| 1,767,411 | 6/1930 | Stone et al. | 308/240 |
| 1,789,092 | 1/1931 | Apps | 308/240 |
| 1,856,304 | 5/1932 | Whiteley | 308/240 |
| 1,923,514 | 8/1933 | Stockfleth | 308/240 |
| 1,936,894 | 11/1933 | Whiteley | 308/240 |
| 3,062,599 | 11/1962 | Campbell | 308/239 |
| 3,436,129 | 4/1969 | James | 308/239 |
| 3,441,328 | 4/1969 | Hurley et al. | 308/239 X |
| 3,938,868 | 2/1976 | VanWyk | 308/239 |
| 4,105,267 | 8/1978 | Mori | 308/240 |

Primary Examiner—Henry K. Artis
Attorney, Agent, or Firm—O'Rourke & Harris

[57] ABSTRACT

A self-lubricating journal bearing includes an arcuate bearing plate having a concave bearing surface. A plurality of lubricant plugs are positioned in apertures in the surface of said plate and are adapted to engage a rotating journal supported on said bearing surface for providing lubrication between said journal and said bearing plate. The lubricant plugs comprise an oil and polymer lubricating composition. The apertures and plugs are arranged to provide continuous lubrication over substantially the entire bearing surface as the journal rotates thereon, and coolant grooves are cut into the bearing surface of said bearing plate in a generally X-shaped pattern for channeling liquid coolant between the journal and the bearing plate.

3 Claims, 5 Drawing Figures

SELF-LUBRICATING JOURNAL BEARING

BACKGROUND OF THE INVENTION

1. Field of the Invention

The present invention relates to journal bearings and, more particularly, to self-lubricating journal bearings incorporating lubricant plugs and coolant channels.

2. Description of the Prior Art

Journal bearings are conventionally formed of fiber or babbit materials. Machines such as those used to hot roll large billets in steel mills utilizing rolls and shafts weighing many tons and are subjected to additional bearing forces of many more tons from the reaction of the rolling process. In many of these machines, the rolls are supported on sleeve or journal bearings which may be made from bronze or babbit metals or from composite structures such as fiberglass mats impregnated with epoxy resin.

In steel mill rolling applications, the roll bearings cannot be lubricated by the well established principles of lubrication engineering because of the high temperatures of the billets of steel which are in close proximity to the bearings. Current practice is to spray the bearing housings with cooling water and to flood the bearings with water for the purposes of cooling and generating a hydrodynamic lubricating film. The bearings wear rapidly and substantial time and cost is involved in the necessary periodic bearing changes.

OBJECTS OF THE INVENTION

It is the principal object of the present invention to provide an improved bearing for supporting a journal or shaft under high temperature and load conditions such as are encountered in a rolling mill.

Another object of the present invention is to provide a journal bearing which is self-lubricating under high load and temperature conditions.

A further object of the present invention is to provide a journal bearing of the foregoing type which is suitable for use with water cooling.

Other objects and advantages of the present invention will become apparent as the following description proceeds, taken in conjunction with the accompanying drawings.

SUMMARY OF THE INVENTION

In accordance with the foregoing objects and as shown in the drawings, the present invention comprises an arcuate bearing plate having a concave bearing surface adapted to support a rotating journal. The bearing plate is mounted in a pillow block. A similar cap structure can be provided. For providing lubrication between the bearing plate and a rotating journal supported thereon, a plurality of lubricant bearing plugs are inserted into apertures in the bearing plate and open into the bearing surface thereof for lubricating engagement with the journal. Coolant channels are cut into the bearing surface of the bearing plate for conducting coolant such as water when the bearing structure is to be utilized in high temperature applications such as supporting rolls in a rail mill. The lubricant bearing material may be a mixture of a hydrocarbon oil and polyethylene or other suitable oil and polymeric material lubricating composition.

DESCRIPTION OF THE PREFERRED EMBODIMENT

Figure 1:
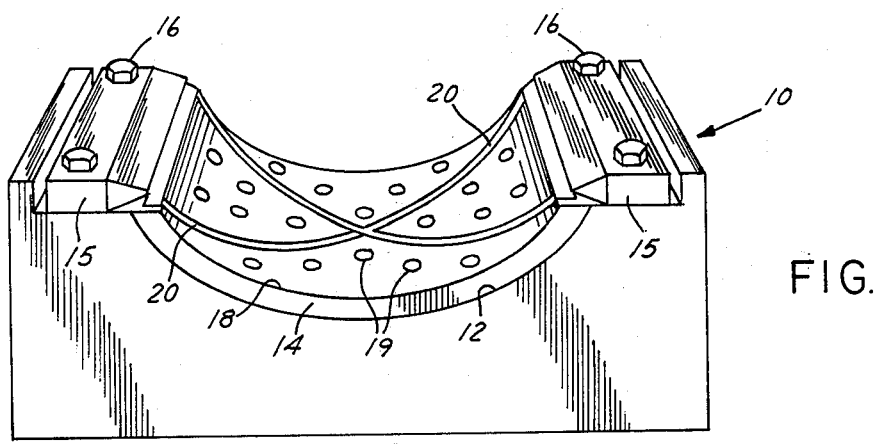
FIG. 1 is an isometric view of a bearing embodying the present invention.
Figure 2:
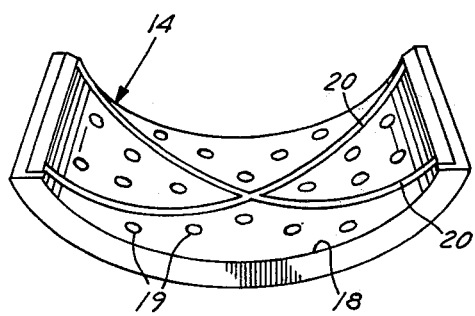
FIG. 2 is an isometric view of a bearing plate of the character shown in FIG. 1.

The present invention, as illustrated in the drawings, comprises a stationary journal bearing structure 10 adapted for rotatably supporting a journal (not shown) and for lubricating and cooling the interface between the rotating journal and the stationary bearing. The bearing structure 10 comprises a pillow block 11 having a concave surface 12 mounting an arcuate bearing plate 14. The bearing plate 14 is held in the pillow block 11 by clamp blocks 15 secured to the pillow block 11 by bolts 16. In use, the journal is rotatably supported on the upper concave surface 18 of the bearing plate 14. When the bearing plate has been worn out by the rotation of the journal, it can be readily replaced in the pillow block 11 by unbolting the bolts 16 and removing the clamps 15. After a substitute bearing plate has been inserted into the pillow block, the clamps 15 are again mounted and bolted in place.

In order to provide for lubrication between the journal and the bearing plate 14, plugs 19 of lubricant containing material are mounted in the bearing plate 14 and project into the bearing surface 18 thereof. The lubricant plugs are formed of a composition of lubricating oil and a high molecular weight polymer. Such a lubricant material may be formed, for example, by mixing polymeric materials such as polyethylene, polypropylene, polyurethanes, polyesters and polyamides, with an appropriate lubricating oil such as a hydrocarbon or petroleum oil, silicone oils or other liquid lubricating materials. Illustrative oil and polymeric material lubricating compositions are disclosed, for example, in U.S. Pat. No. 3,541,011, issued Nov. 17, 1970 to W. J. Davis et al., and U.S. Pat. No. 3,547,819, issued Dec. 15, 1970 to W. J. Davis et al.

In operation, the polymeric lubricating medium wicks lubricating oil to the journal supported on the bearing plate. As the shaft rotates under load, oil is drawn from the plugs of polymeric lubricating medium in the bearing by capillary action. This oil then forms a lubricating film under pressure between the journal and the supporting surface of the bearing plate.

Where the bearing structure is to be utilized in an environment in which the journal is subjected to extreme heat, it is desirable that provision be made for cooling the bearing structure. One conventional procedure is to spray the bearing structure with water. In order to provide for the flow of coolant water through the bearing, channels 20 are desirably cut in the bearing surface 18 of the bearing plate 14. In the embodiment shown in the drawings, the coolant channels 20 extend diagonally across the surface of the bearing plate, thereby forming an X-shaped water channel.

Figure 4:
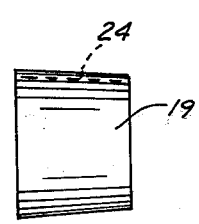
FIG. 4 is an elevation view of a lubricant plug adapted for use in the bearing plate shown in FIG. 2.
Figure 5:
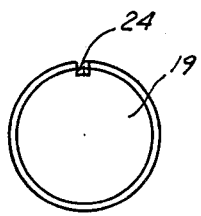
FIG. 5 is an end view of the lubricant plug shown in FIG. 4.
Figure 3:
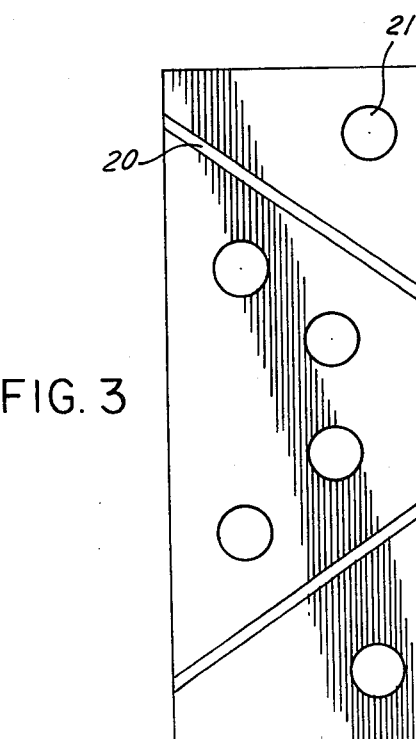
FIG. 3 is an enlarged layout view of a bearing plate embodying the present invention, showing the location of lubricant plugs and coolant channels.

The lubricant plugs 19 are received in holes or apertures 21 cut into the surface 18 of the bearing plate 14. In order to insure a continuous film of lubrication over the major portion of the bearing surface, the alignment of the holes 21 is staggered as shown in FIG. 3 so that the holes and thus the lubricant plugs overlap in the direction of rotation, indicated by the arrow 22 shown on FIG. 3. The plugs 19 are tapered as shown in FIG. 4 to a frusto-conical form to provide for a press fit into the holes 21. In order to provide an escape for air trapped in the holes behind the plugs, the plugs may be provided with an axially extending groove 24.

During operation of the journal bearing, lubricant weeps from the plugs and provides a lubricating film between the journal and the bearing surface. In order to maintain the desired lubricating characteristics of the bearing plate, the plugs can be periodically replaced. The use of the lubricant plugs obviates the necessity for external lubrication of the bearing structure.

The bearing structure may also include a corresponding cap bearing (not shown) including a similar bearing plate mounted on top of the journal in the conventional manner.

While a certain illustrative embodiment of the present invention has been shown in the drawings described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

What we claim is:

1. In a journal bearing subjectable to severe conditions, an arcuate bearing plate having a concave bearing surface, a plurality of apertures opening into said surface, a plug of lubricant containing material comprising an oil and a polymer composition inserted into each of said apertures and adapted to engage a rotating journal supported on said bearing surface for providing lubrication between said journal and said bearing plate, and coolant grooves cut into and extending substantially entirely across the bearing surface of said bearing plate for channeling a liquid coolant other than said lubricant containing material between the journal and the bearing plate.

2. A journal bearing as defined in claim 1 wherein said coolant grooves are generally X-shaped in pattern.

3. In a self-lubricating journal bearing subjectable to severe conditions, an arcuate bearing plate having a concave bearing surface, a plurality of apertures opening into said surface, a frusto-conical lubricant plug inserted into each of said apertures and adapted to engage a rotating journal supported on said bearing surface for providing lubrication between said journal and said bearing plate, each said lubricant plug comprising an oil and polymer lubricating composition, each said plug having an air escape channel defined in a wall thereof, said apertures and plugs being arranged to provide continuous lubrication over substantially the entire bearing surface as the journal rotates thereon, and coolant grooves cut into and extending substantially entirely across the bearing surface of said bearing plate in a generally X-shaped pattern for channeling a liquid coolant other than said oil and polymer lubrication composition between the journal and the bearing plate whereby said lubricated bearing plate is capable of supporting heavy journals under high temperature conditions.

* * * * *